(12) United States Patent
Barnes et al.

(10) Patent No.: US 10,641,343 B2
(45) Date of Patent: May 5, 2020

(54) CLUTCH ASSEMBLY WITH SPRING RETENTION FEATURE

(71) Applicant: SCHAEFFLER TECHNOLOGIES AG & CO. KG, Herzogenaurach (DE)

(72) Inventors: Jay Barnes, Clinton Township, MI (US); Alaa Makke, Farmington Hills, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 169 days.

(21) Appl. No.: 15/839,116

(22) Filed: Dec. 12, 2017

(65) Prior Publication Data

US 2019/0178303 A1 Jun. 13, 2019

(51) Int. Cl.
| | |
|---|---|
| *F16D 13/70* | (2006.01) |
| *F16D 25/08* | (2006.01) |
| *F16D 13/52* | (2006.01) |
| *F16C 33/46* | (2006.01) |
| *F16C 19/30* | (2006.01) |
| *F16C 33/58* | (2006.01) |

(52) U.S. Cl.
CPC .............. *F16D 13/70* (2013.01); *F16C 19/30* (2013.01); *F16C 33/4605* (2013.01); *F16C 33/581* (2013.01); *F16D 13/52* (2013.01); *F16D 25/083* (2013.01)

(58) Field of Classification Search
CPC .......... F16D 13/38; F16D 13/52; F16D 13/70; F15D 25/08; F15D 25/082; F15D 25/083
See application file for complete search history.

(56) References Cited

U.S. PATENT DOCUMENTS

| | | | | |
|---|---|---|---|---|
| 3,684,069 | A * | 8/1972 | Pray ...................... | F16D 25/082 192/85.53 |
| 5,234,090 | A * | 8/1993 | Haka ..................... | F16D 25/082 188/196 P |
| 5,931,275 | A * | 8/1999 | Kasuya ............... | F16H 63/3026 192/109 R |
| 8,607,949 | B2 * | 12/2013 | Noehl ..................... | F16D 13/70 192/48.606 |
| 8,640,844 | B2 * | 2/2014 | Kuwahara ............. | F16D 25/082 192/113.5 |

(Continued)

FOREIGN PATENT DOCUMENTS

CN 204082903 U 1/2015

*Primary Examiner* — David R Morris
*Assistant Examiner* — James J Taylor, II
(74) *Attorney, Agent, or Firm* — Reid Baldwin

(57) ABSTRACT

Reaction plates and clutch assemblies including the reaction plates are disclosed. The clutch assembly may include at least one rotatable clutch plate, a reaction plate arranged to rotate with and apply a force to the clutch plate(s), and a piston. At least one bearing rolling element may be arranged between the reaction plate and the piston to permit relative rotational motion therebetween. A bearing cage may be retained by the reaction plate or the piston. A spring may be configured to urge the reaction plate away from the clutch plate(s). The reaction plate may include a retention tab configured to retain the spring in an axial direction. The retention tab may be formed on an axial portion of the reaction plate that extends in the axial direction. The axial portion may be disposed between two radial portions of the reaction plate that extend in a radial direction.

12 Claims, 1 Drawing Sheet

(56) References Cited

U.S. PATENT DOCUMENTS

| | | | |
|---|---|---|---|
| 9,080,612 B2* | 7/2015 | Fujii | F16D 13/40 |
| 9,222,524 B2* | 12/2015 | Saito | B60K 6/387 |
| 9,234,551 B2* | 1/2016 | Heitzenrater | F16D 23/14 |
| 9,505,303 B2* | 11/2016 | Lucienne | B60K 17/10 |
| 9,593,724 B2 | 3/2017 | Hemphill et al. | |
| 10,054,171 B2* | 8/2018 | Ohno | B60K 17/02 |
| 10,267,401 B2* | 4/2019 | Valente | F16D 25/082 |
| 2018/0361851 A1* | 12/2018 | Nozu | B60K 17/344 |

* cited by examiner

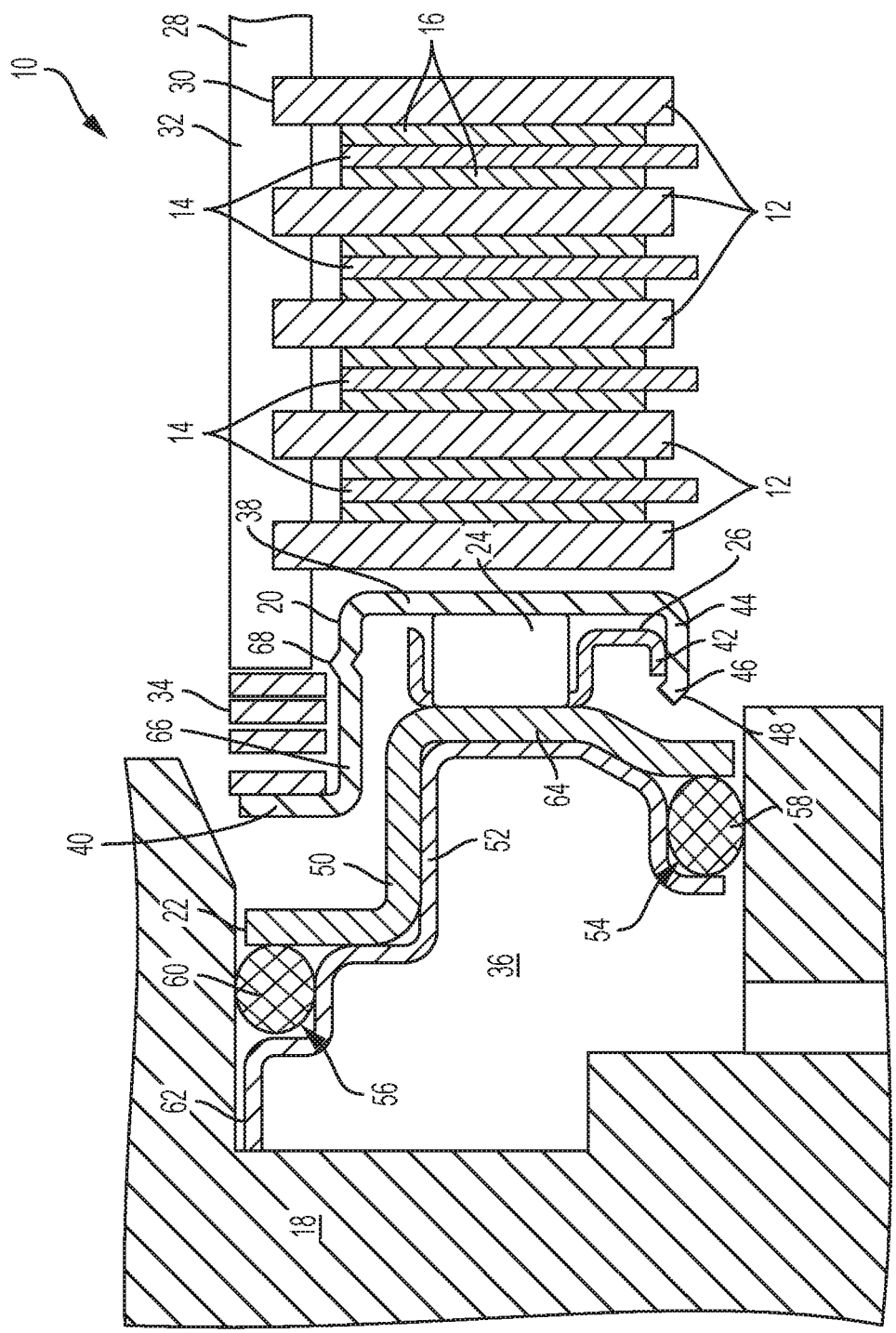

CLUTCH ASSEMBLY WITH SPRING RETENTION FEATURE

TECHNICAL FIELD

The present disclosure relates generally to a clutch assembly including a spring retention feature.

BACKGROUND

Transmission systems may include clutch assemblies. Such clutch assemblies may include a piston. During an engagement, the piston may be urged towards a clutch pack. An axial force from the piston may ultimately cause the clutch to be engaged.

SUMMARY

In at least one embodiment, a clutch assembly is provided. The clutch assembly may include at least one rotatable clutch plate; a reaction plate arranged to rotate with and apply a force to the at least one rotatable clutch plate; and a piston. At least one bearing rolling element may be arranged between the reaction plate and the piston to permit relative rotational motion therebetween. A cage for positioning the at least one bearing rolling element is provided, the cage may be retained by the reaction plate or the piston. A spring is configured to urge the reaction plate away from the at least one rotatable clutch plate. The reaction plate includes a retention tab configured to retain the spring in an axial direction.

In one embodiment, the retention tab is formed on an axial portion of the reaction plate that extends in the axial direction. The axial portion may be disposed between two radial portions of the reaction plate that extend in a radial direction. In one embodiment, the retention tab at least partially overlaps with the spring in a radial direction. The retention tab may be disposed between the spring and the at least one clutch plate in the axial direction. In another embodiment, the retention tab is formed as a radially outward shift of the reaction plate.

The reaction plate may have a substantially same thickness in a region of the retention tab and in a surrounding region of the reaction plate. The retention tab may be formed as a thickened region of the reaction plate relative to a surrounding region of the reaction plate. In one embodiment, an inner radial diameter of the reaction plate is substantially the same in the thickened region and the surrounding region. The retention tab may extend completely around the reaction plate in a circumferential direction. In one embodiment, the retention tab in continuous in the circumferential direction. The reaction plate may include a plurality of retention tabs configured to retain the spring in an axial direction. The retention tabs may be spaced apart in a circumferential direction.

In at least one embodiment, a reaction plate for a clutch assembly is provided. The reaction plate may include a first radially extending portion configured to contact a spring that is configured to urge the reaction plate away from a rotatable clutch plate; a second radially extending portion configured to contact a bearing rolling element; and an axially extending portion disposed between the first and second radially extending portions, the axially extending portion including a retention tab configured to retain the spring in an axial direction.

In one embodiment, the retention tab is configured to at least partially overlap with the spring in a radial direction. The retention tab may be formed as a radially outward shift of the reaction plate. In one embodiment, the reaction plate has a substantially same thickness in a region of the retention tab and in a surrounding region of the reaction plate. The retention tab may extend continuously completely around the reaction plate in a circumferential direction. The reaction plate may include a plurality of retention tabs configured to retain the spring in an axial direction. In one embodiment, the retention tabs are spaced apart in a circumferential direction.

BRIEF DESCRIPTION OF THE DRAWINGS

FIGURE is a cross-sectional view of a clutch assembly, according to an embodiment.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the FIGURES can be combined with features illustrated in one or more other FIGURES to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

With reference to the FIGURE, an example cross-sectional view of a clutch assembly 10 is shown. The clutch assembly 10 may be a transmission clutch assembly and may be incorporated into a rear differential unit (RDU), for example. Transmission clutch assembly 10 includes clutch plates 12 and friction plates 14 which may be collectively referred to as a clutch pack. Friction plates 14 include friction material rings 16 on each side. Clutch plates 12 are rotatable with respect to housing 18 for the transmission. Although five clutch plates and four friction plates are shown, other numbers of clutch plates and friction plates are possible. An example of a clutch assembly is shown and described in U.S. Pat. No. 9,593,724, filed Feb. 27, 2015, the entire disclosure of which is incorporated by reference herein. The description and embodiments disclosed therein in may be combined with the present disclosure to create further embodiments.

Transmission clutch assembly 10 may include reaction plate 20, piston 22, bearing rolling element 24, and cage 26.

Reaction plate 20 (which may also be referred to as a Z-disk) may be arranged to rotate with and apply a force to clutch plate 12, although in other embodiments, plate 20 may apply a force to one of friction plates 14. In other words, the reaction plate may be configured to engage the clutch pack. Piston 22 may be non-rotatable with respect to housing 18 and sealed to housing 18. During normal operation of clutch pack 10, piston 22 may not rotate in the housing, allowing for a robust sealing and decreased leakage at the seal, thereby reducing pumping losses.

Bearing rolling element 24 may be arranged between and contactable with the reaction plate 20 and the piston 22 to permit relative rotational motion therebetween. Bearing rolling element 24 may be one of a plurality of rolling elements, such as cylindrical rollers, arranged to roll between the reaction plate 20 and piston 22 during relative rotation between the two components. Cage 26 is for retaining and positioning rolling elements 24 radially and maintaining proper spacing in a circumferential direction. Cage 26 may be retained by reaction plate 20, as described below. The bearing rolling element 24 and cage 26 may be collectively referred to as a bearing element.

Clutch carrier 28 may be rotationally engaged with clutch plate 12. That is, the clutch plate 12 may have an external toothed portion 30 engaged with a carrier internal complementary spline portion 32 so that the clutch plate 12 and carrier rotate in unison but the clutch plate can still move axially in the carrier to engage the clutch. Otherwise stated, the clutch pack is installed in the carrier. Rearmost clutch plate 12 may be axially retained by a carrier feature or snap ring (not shown). Release spring 34 may be installed between and compressively engaged with the clutch carrier 28 and the reaction plate 20 to urge the reaction plate 20 away from the clutch plate 12. That is, without sufficient hydraulic pressure in chamber 36 formed by housing 18 and piston 22 to engage the clutch, spring 34 may disengage the clutch. In one embodiment, the spring 34 may be a wave spring.

Reaction plate 20 may include radial portion 38, which may be contactable with the rotatable clutch plate 12 on one side and the bearing rolling element 24 on the other side. Reaction plate 20 may include radial portion 40 contactable with the spring. Portion 38 may be radially inside of portion 40. Portion 40 may also include a toothed portion (not shown) engaged with clutch carrier spline portion 32 so that the reaction plate 20 and the clutch carrier 28 are rotationally connected.

Cage 26 may include circumferential ring 42. Reaction plate 20 may include circumferential ring 44 with a radial bump 46 at distal end 48. Cage ring 42 may be retained by radial bump 46. That is, the cage 26 may be retained on the reaction plate 20 and prevented from being removed by the bump 46. The bump 46 may be a pre-formed feature in which case the cage 26 would be snapped onto the reaction plate 20, or the bump 46 may be formed after the cage 26 is installed onto the reaction plate 20 by staking or the like.

Piston 22 may include segments, or plates, 50 and 52, which may be fixed to one another (although not required) and may provide a pair of o-ring grooves 54 and 56. Segments 50 and 52 may be fixed together by any suitable technique, such as press-fitting, adhesives, or riveting (or other fasteners), for example. Segment 50 may be contactable with bearing rolling element 24 on a radial portion 64 (e.g., radial portion 64 may be a bearing raceway). In such an embodiment, the segment 50 may be a hardened metal, such as steel. In other embodiments, the segment 50 may not directly contact the rolling element 24 (e.g., there may be at intermediate component). Segment 52 may include an axial protrusion 62 for limiting a disengagement travel of piston 22. Piston 22 may include o-rings 58 and 60 installed in grooves 54 and 56, respectively, for sealing with inner and outer portions, or circumferential surfaces, of the housing, respectively. In other words, o-rings 58 and 60 may be radially inner and outer seals, respectively.

During an engagement, hydraulic pressure in chamber 36 may urge piston 22 towards the clutch pack. An axial force from the piston 22 may act on bearing rolling element 24, which in-turn acts on reaction plate 20, overcoming force from spring 34. The reaction plate 20 may press against clutch plate 12 to clamp the clutch pack and engage the clutch. Because the reaction plate and the clutch plate are both rotationally fixed to the clutch carrier and rotate together, there may be no relative motion between the two components. In other embodiments, the two may not be rotationally connected, but friction from spring 34 acting on the reaction plate 20 and the clutch carrier 28 may keep the two at a similar rotational speed. Bearing rolling element 24 may effectively rotationally disconnect the piston 22 from the rotating reaction plate 20 so that the piston 22 is not rotating and can use conventional static seals against the non-rotating housing.

In at least one embodiment, the reaction plate 20 may include a portion 66 disposed between radial portions 38 and 40. The portion 66 may extend in the axial direction or substantially in the axial direction. The portion 66 may be radially inside of the spring 34 except for a retention tab or protrusion 68. The retention tab 68 may extend radially outward relative to the rest of the portion 66 and may at least partially overlap with the spring 34 in the radial direction. The retention tab may be located axially between the portion 38 and the portion 40, for example axially between the spring 34 and the portion 38. Accordingly, the retention tab 68 may retain the spring 34 in the axial direction.

The retention tab 68 may prevent or reduce the risk of the spring 34 falling out or shifting during an assembly process of the clutch assembly 10. Prior to the present disclosure, the spring could easily become dislodged or fall out completely during assembly. The retention tab 68 may be formed during a stamping process for the reaction plate 20. However, any forming process may be used to form the retention tab. In one embodiment, the retention tab 68 may extend completely around the reaction plate 20 in the circumferential direction. In other embodiments, the retention tab 68 may not extend completely around the reaction plate. For example, there may be a plurality of retention tabs 68 spaced about the reaction plate in the circumferential direction. In one embodiment, the retention tabs 68 may be evenly spaced in the circumferential direction. In the embodiment shown, the retention tab 68 may be formed by a radially outward shift in the portion 66, such that the reaction plate 20 maintains a same, or substantially same, thickness in the region with the retention tab(s) 68 as in the surrounding regions. However, in other embodiments, the retention tab(s) 68 may be formed by a thicker region of the reaction plate, such that an inner radial diameter of the portion 66 remains the same or substantially the same in the region of the retention tab(s) 68.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch assembly comprising:
    a rotatable hub;
    at least one rotatable clutch plate splined to the hub;
    a reaction plate arranged to rotate continuously with the hub and move axially with respect to the hub to apply a force to the at least one rotatable clutch plate, the reaction plate having an axial portion disposed between two radial portions, the axial portion extending in an axial direction and the radial portions extending in a radial direction, the axial portion including a retention tab;
    a piston;
    at least one bearing rolling element arranged between the reaction plate and the piston to permit relative rotational motion therebetween;
    a cage for positioning the at least one bearing rolling element, the cage retained by the reaction plate or the piston and;
    a spring configured to urge the reaction plate away from the at least one rotatable clutch plate, wherein one of the two radial portions contacts a first end of the spring and the retention tab contacts a second end of the spring opposite the first end of the spring.

2. The clutch assembly of claim 1, wherein the retention tab at least partially overlaps with the spring in the radial direction.

3. The clutch assembly of claim 1, wherein the retention tab is disposed between the spring and the at least one clutch plate in the axial direction.

4. The clutch assembly of claim 1, wherein the retention tab is formed as a radially outward shift of the reaction plate.

5. The clutch assembly of claim 4, wherein the reaction plate has a substantially same thickness in a region of the retention tab and in a surrounding region of the reaction plate.

6. The clutch assembly of claim 1, wherein the spring is radially further from a centerline than the at least one bearing rolling element.

7. The clutch assembly of claim 1, wherein the reaction plate includes a bump configured to retain the cage in the axial direction.

8. A reaction plate for a clutch assembly, comprising:
    a first radially extending portion configured to contact a spring that is configured to urge the reaction plate away from a rotatable clutch plate;
    a second radially extending portion configured to contact a bearing rolling element; and
    an axially extending portion integrally formed between the first and second radially extending portions as a single piece, the axially extending portion including a retention tab configured to retain the spring in an axial direction, wherein
    the first radially extending portion is configured to contact a first end of the spring and the retention tab is configured to contact a second end of the spring opposite the first end of the spring.

9. The reaction plate of claim 8, wherein the retention tab is configured to at least partially overlap with the spring in a radial direction.

10. The reaction plate of claim 8, wherein the retention tab is formed as a radially outward shift of the reaction plate.

11. The reaction plate of claim 10, wherein the reaction plate has a substantially same thickness in a region of the retention tab and in a surrounding region of the reaction plate.

12. The reaction plate of claim 8, further comprising a circumferential ring having a bump configured to retain the cage in the axial direction.

* * * * *